(12) United States Patent
Li et al.

(10) Patent No.: US 12,353,403 B2
(45) Date of Patent: Jul. 8, 2025

(54) MANAGING GLOBAL TRANSACTIONS IN HYBRID DATABASE PARADIGMS

(71) Applicant: SAP SE, Walldorf (DE)

(72) Inventors: Hui Li, Shanghai (CN); Xia Yu, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/515,526

(22) Filed: Nov. 21, 2023

(65) Prior Publication Data

US 2025/0165459 A1     May 22, 2025

(51) Int. Cl.
*G06F 16/23* (2019.01)

(52) U.S. Cl.
CPC ...... *G06F 16/2379* (2019.01); *G06F 16/2365* (2019.01)

(58) Field of Classification Search
CPC .. G06F 16/23; G06F 16/2365; G06F 16/2379; G06F 16/25
See application file for complete search history.

(56) References Cited

U.S. PATENT DOCUMENTS

| | | | |
|---|---|---|---|
| 9,679,010 B2 | 6/2017 | Fu et al. | |
| 9,734,187 B2* | 8/2017 | Fuchs | G06F 16/2379 |
| 10,489,381 B2 | 11/2019 | Yu et al. | |
| 10,503,572 B2 | 12/2019 | Peng et al. | |
| 10,565,089 B2 | 2/2020 | Yu et al. | |
| 11,153,374 B1 | 10/2021 | Yu et al. | |
| 11,334,558 B2 | 5/2022 | Yu et al. | |
| 11,620,277 B2* | 4/2023 | Zhang | G06F 16/2379 |
| | | | 707/682 |
| 2003/0172091 A1* | 9/2003 | Norcott | G06F 16/2358 |
| | | | 707/999.203 |
| 2021/0173838 A1 | 6/2021 | Yu et al. | |
| 2022/0129314 A1 | 4/2022 | Yu et al. | |
| 2022/0365832 A1 | 11/2022 | Feng et al. | |
| 2022/0374439 A1 | 11/2022 | Hu et al. | |

(Continued)

FOREIGN PATENT DOCUMENTS

| | | | | |
|---|---|---|---|---|
| CN | 111198751 A | * | 5/2020 | ............. G06F 9/466 |
| CN | 116775325 A | * | 9/2023 | ............. G06F 9/465 |
| WO | WO-2018103318 A1 | * | 6/2018 | ......... G06F 16/2358 |

OTHER PUBLICATIONS

U.S. Appl. No. 17/836,042, Feng et al., Adaptive Application Server Request Balancing, filed Jun. 9, 2022, 36 pages.

(Continued)

*Primary Examiner* — James E Richardson
(74) *Attorney, Agent, or Firm* — Fish & Richardson P.C.

(57) ABSTRACT

Methods, systems, and computer-readable storage media for executing, by a first database system, a first sub-transaction of a global transaction, the first sub-transaction impacting a primary record in a first database, in response to successful execution of the first sub-transaction, executing, by a second database system, a second sub-transaction including setting a status of a secondary record to a pending status in a status column of a table that stores data of the secondary record, in response to successfully setting the status, executing, by the first database system, one or more operations to commit changes to the primary record, and selectively setting, by the second database system, the status to one of a first final status and a second final status.

20 Claims, 6 Drawing Sheets

(56) References Cited

U.S. PATENT DOCUMENTS

2022/0382748 A1* 12/2022 Narasimhamurthy .................
G06F 16/2386
2023/0086361 A1   3/2023 Wan et al.
2023/0342143 A1  10/2023 Yu et al.

OTHER PUBLICATIONS

U.S. Appl. No. 17/951,799, Li et al., Efficient Cache Build and Query Pattern Supporting Dynamic and Relational Properties, filed Sep. 23, 2022, 37 pages.
U.S. Appl. No. 18/332,860, Li, Proactive Adaptation in Handling Service Requests in Cloud Computing Systems, filed Jun. 12, 2023, 41 pages.
U.S. Appl. No. 18/365,366, Feng et al., Scheduling Services in Cloud-Based Systems to Avoid Timeout, filed Aug. 4, 2023, 33 pages.
U.S. Appl. No. 18/454,207, Li et al., Middleware for Communication Between Microservices and Monolithic Application, filed Aug. 23, 2023, 33 pages.
U.S. Appl. No. 18/465,370, Feng et al., Distributed Connection Management in Cloud System, filed Sep. 12, 2023, 27 pages.
U.S. Appl. No. 18/469,650, Li et al., Metrics Data Storage and Access, filed Sep. 19, 2023, 28 pages.
U.S. Appl. No. 18/495,862, Yu et al., Protecting Cloud Systems Using Request Scores, filed Oct. 27, 2023, 38 pages.
U.S. Appl. No. 18/505,204, Li, Improved Resource Utilization in Job Scheduler Systems, filed Nov. 9, 2023, 28 pages.

* cited by examiner

MANAGING GLOBAL TRANSACTIONS IN HYBRID DATABASE PARADIGMS

BACKGROUND

Enterprise application software can execute transactions that implicate interactions with database systems. In some cases, a transaction can be provided as a global transaction that is made up of two or more sub-transactions. In such cases, standards (e.g., the eXtended Architecture (XA) standard) can be provided to manage the global transaction. However, some applications interact with multiple, disparate databases in a hybrid database paradigm. For example, a sub-transaction is executed on one database and a sub-transaction is executed on another, disparate database. In some hybrid database paradigms, there is no standard that enables management of global transactions. As a result, global transactions must be manually managed, which is a non-trivial task that is both time- and resource-inefficient, in terms of technical resources (e.g., processing, memory, bandwidth) expended.

SUMMARY

Implementations of the present disclosure are directed to managing global transactions for software systems in hybrid database paradigms. More particularly, implementations of the present disclosure are directed to a transaction management framework to manage global transactions for applications that use multiple, disparate databases.

In some implementations, actions include executing, by a first database system, a first sub-transaction of a global transaction, the first sub-transaction impacting a primary record in a first database, in response to successful execution of the first sub-transaction, executing, by a second database system, a second sub-transaction including setting a status of a secondary record to a pending status in a status column of a table that stores data of the secondary record, in response to successfully setting the status, executing, by the first database system, one or more operations to commit changes to the primary record, and selectively setting, by the second database system, the status to one of a first final status and a second final status. Other implementations of this aspect include corresponding systems, apparatus, and computer programs, configured to perform the actions of the methods, encoded on computer storage devices.

These and other implementations can each optionally include one or more of the following features: the pending status includes an invalidate pending status and one of the first final status includes an invalid status that is set in response to determining that the changes to the primary record are successfully committed, and the first final status includes a valid status that is set in response to determining that the changes to the primary record failed to be committed; the pending status includes a validate pending status and one of the second final status includes a valid status that is set in response to determining that the changes to the primary record are successfully committed, and the second final status includes an invalid status that is set in response to determining that the changes to the primary record failed to be committed; execution of the second sub-transaction results in one of adding the secondary record to the secondary database and deleting the secondary record from the secondary database; selectively setting the status to one of a first final status and a second final status includes at least one retry to set the status to one of a first final status and a second final status; the primary record and the secondary record are representative of an entity; and the first database includes a relational database management system (RDBMS) database and the second database includes a non-RDBMS database.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
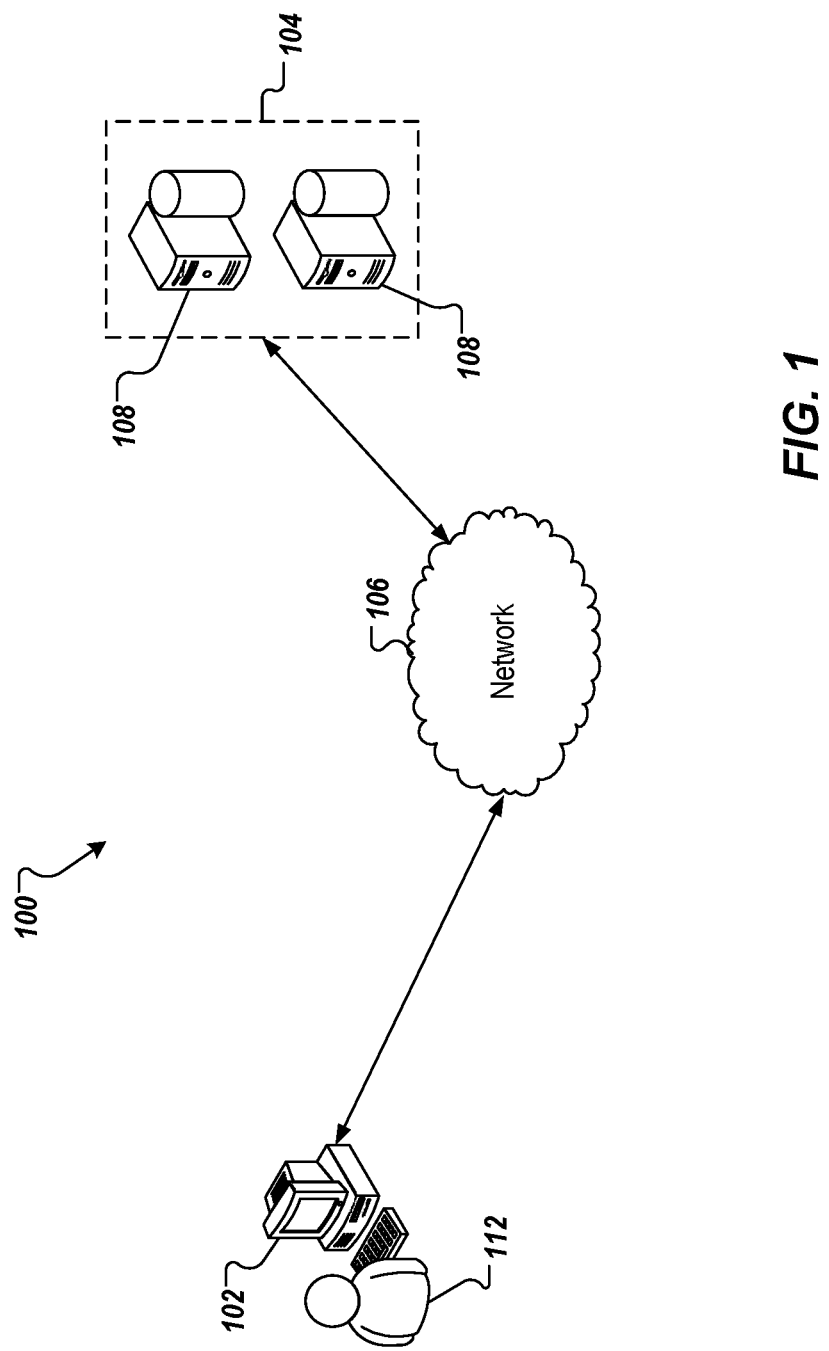
FIG. 1 depicts an example architecture that can be used to execute implementations of the present disclosure.

Implementations of the present disclosure are directed to managing global transactions for software systems in hybrid database paradigms. More particularly, implementations of the present disclosure are directed to a transaction management framework to manage global transactions for applications that use multiple, disparate databases. Implementations can include actions of executing, by a first database system, a first sub-transaction of a global transaction, the first sub-transaction impacting a primary record in a first database, in response to successful execution of the first sub-transaction, executing, by a second database system, a second sub-transaction including setting a status of a secondary record to a pending status in a status column of a table that stores data of the secondary record, in response to successfully setting the status, executing, by the first database system, one or more operations to commit changes to the primary record, and selectively setting, by the second database system, the status to one of a first final status and a second final status.

To provide further context for implementations of the present disclosure, and as introduced above, applications (e.g., enterprise application software) can execute transactions that implicate database systems. For example, an application can execute a transaction that uses a relational database management system (RDBMS), which can be referred to as structured query language (SQL) database systems. Example RDBMSs can include, without limitation, SAP HANA, MySQL, Oracle, and PostgreSQL. Most types of RDBMSs support the extended Architecture (XA) standard, which can be described as an open group standard for accessing different RDBMS data stores within a single global transaction. Here, a global transaction can describe a transaction that is made up of multiple sub-transactions (e.g., the global transaction is complete when each of the sub-transactions is complete). XA governs how a transaction manager can inform the RDBMS what work is going on as part of the transaction, how to conduct, for example, a two-phase commit (2PC) protocol at the end of each transaction, and how to recover pending transactions from the data store.

However, applications are increasingly using multiple, disparate types of databases in a hybrid database paradigm. Here, a hybrid database paradigm refers to a scenario, in which an application interacts with multiple, disparate types of databases. For example, a hybrid database paradigm can include a scenario, in which an application interacts with a RDBMS (e.g., a database system that stores data in relational tables) as well as a non-SQL database system, also referred to as NoSQL database systems. Here, a NoSQL database system can generally be described as a database system that does not store data in relational tables. Example NoSQL database systems can include, without limitation, MongoDB, Cassandra, CouchDB, Hive, and HBase. In an example hybrid database paradigm, a RDBMS database can be used as a primary database for logic data (e.g., data to be used in execution of logic) and use a NoSQL database as a secondary database for extended information (e.g., audit history, documents, images, video).

As most types of NoSQL database systems do not support XA (or even support transactions at all), it is impossible to use XA to manage global transactions. For example, within a global transaction an application can seek to store basic information of a user into a RDBMS database (e.g., a first sub-transaction) and store extended information of the user into a NoSQL database (e.g., a second sub-transaction). However, because a NoSQL database is used, the global transaction cannot be managed using XA. As a result, the global transaction must be manually managed, which is a non-trivial task that is both time- and resource-inefficient, in terms of technical resources (e.g., processing, memory, bandwidth) expended.

In view of the above context, implementations of the present disclosure provide a transaction management framework to manage global transactions for applications that use multiple, disparate databases in a hybrid database paradigm. As described in further detail herein, the transaction management framework of the present disclosure includes providing a status column (STATUS) in tables of a secondary database (e.g., NoSQL database), dividing each global transaction into a set of steps that includes a try step, a confirm step, and a cancel step, and using a sub-transaction on a primary database (e.g., RDBMS database) to manage the try step. If the try step succeeds, the confirm step is called. If the try step fails, the cancel step is called. If either the confirm step or the cancel step fails, a scheduled job is executed to retry the respective step.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host an application that executes global transactions over multiple, disparate databases in a hybrid database paradigm, the server system 104 also hosting the databases. In accordance with implementations of the present disclosure, a transaction management framework can be provided to manage global transactions of the application on the multiple, disparate databases. For example, and without limitation, a global transaction can include a first sub-transaction that is executed on a primary database (e.g., RDBMS database) and a second sub-transaction that is executed on a secondary database (e.g., NoSQL database).

Figure 2:
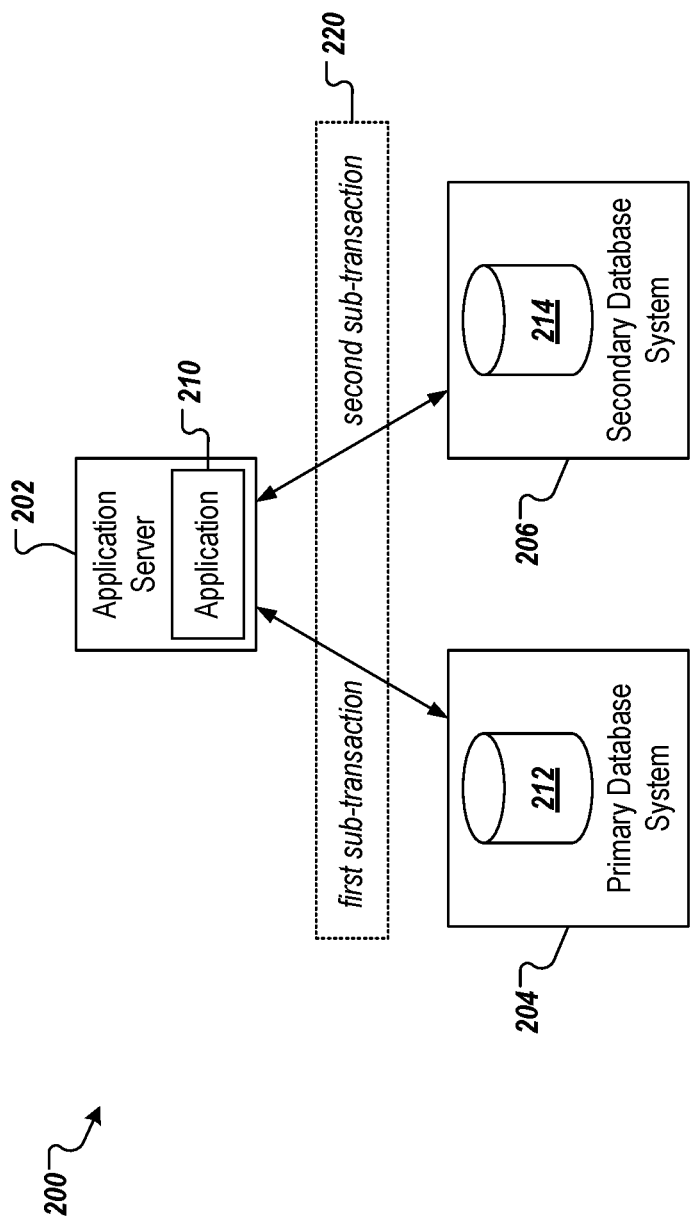
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes an application server 202, a primary database system 204, and a secondary database system 206. The application server 202 executes an application 210, the primary database system 204 includes a primary database 212, and the secondary database system 206 includes a secondary database 214.

In accordance with implementations of the present disclosure, the application 210 can initiate a global transaction 220 that can include a first sub-transaction executed on the primary database system 204 and a second sub-transaction executed on the secondary database system 206. For example, and without limitation, the global transaction 220 can include recording user data to the primary database 212 and the secondary database 214, where the first sub-transaction is executed to record basic information of a user (e.g., name, address, role) in the primary database 212 and the second sub-transaction is executed to record extended information of the user (e.g., documents, images, video) in the secondary database 214.

In accordance with implementations of the present disclosure, the primary database 212 of the primary database system 204 can be a first type and the secondary database 214 of the secondary database system 206 can be a second type, which is different from the first type. By way of non-limiting example, the primary database 212 can be a RDBMS database and the secondary database 214 can be a NoSQL database. As such, the conceptual architecture 200 is representative of a hybrid database paradigm.

The conceptual architecture 200 can include a transaction management framework of the present disclosure to manage execution of global transactions, as described in detail herein. In some examples, the transaction management framework is provisioned as herein-described functionality executed by the primary database system 204 and the secondary database system 206.

In further detail, the secondary database 214 stores one or more tables that the global transaction 220 will interact with. In accordance with implementations of the present disclosure, each such table includes a status column (STATUS) that is updated during execution of the global transaction. Table 1 provides a definition of the status column:

TABLE 1

Definition of STATUS Column

| STATUS Value | Temporary or persistent status? | Is the record used in logic? |
|---|---|---|
| VALIDATE_PENDING | temporary | No |
| INVALIDATE_PENDING | temporary | No |
| VALID | persistent | Yes |
| INVALID | persistent | No |

The value of STATUS is of an emulation type and, at any given time, can be set to one of VALIDATE_PENDING, INVALIDATE_PENDING, VALID, and INVALID. The values VALIDATE_PENDING and INVALIDATE_PENDING each represent a temporary status. The values VALID and INVALID each represent a persistent status. Only records having a STATUS of VALID can be used by logic (e.g., logic executed by the application 210). For example, and with non-limiting reference to an e-commence application, there are many product records that can be queried to display products (e.g., to a customer) that are responsive to the query. The query is only run over those records having a STATUS of VALID. For example, customers can only buy products with a STATUS of VALID, and an inventory system only counts products with a STATUS of VALID. Table 2 provides an example of a NoSQL table with table name USER_RESUME, which can be stored in the secondary database 214:

TABLE 2

NoSQL Table USER_RESUME

| Column | Type | Remark |
|---|---|---|
| ID | Integer | Primary key |
| USER_ID | Varchar | The Id of the User |
| CONTENT | Blob | The content of the resume |
| STATUS | Varchar | Emulation Values: VALIDATE_PENDING, INVALIDATE_PENDING, VALID, INVALID |

As introduced above, the global transaction is split into a set of steps that includes a try step, a confirm step, and a cancel step. As described in further detail herein, the STATUS of one or more records impacted by the global transaction in the table will be changed at each step of try, confirm, and cancel. If the try step succeeds, the confirm step is called. If the try step fails, the cancel step is called. If either the confirm step or the cancel step fails, a scheduled job is executed to retry the respective step.

In some implementations, the global transaction can include adding a record, updating a record, or deleting a record. By way of non-limiting example, and with continued reference to FIG. 2, the global transaction can include adding a user, which can include adding a record of the user to the primary database 212 and adding a corresponding record of the user to the secondary database 214. The global transaction can include updating a user, which can include updating a record of the user in the primary database 212 and updating a corresponding record of the user in the secondary database 214. The global transaction can include deleting a user, which can include deleting a record of the user from the primary database 212 and deleting a corresponding record of the user from the secondary database 214.

With regard to adding, during the try step, a new record can be added to a table in the secondary database 214 and STATUS of the new record is set to VALIDATE_PENDING. If the confirm step is called (try step was successful), STATUS of the new record is changed from VALIDATE_PENDING to VALID. If the cancel step is called (try step was unsuccessful), STATUS of the new record is changed from VALIDATE_PENDING to INVALID.

With regard to deleting, during the try step, STATUS of the old record that is to be deleted is changed from VALID to INVALIDATE_PENDING. In the context of the present disclosure, an old record refers to a record that existed in the table prior to the global transaction being initiated. If the confirm step is called (try step was successful), STATUS of the record is changed from INVALIDATE_PENDING to INVALID. If the cancel step is called (try step was unsuccessful), STATUS of the record is changed from INVALIDATE_PENDING to VALID.

With regard to updating, updating can be performed by deleting an old record and inserting a new record (with the new/updated content). The key points of the update operation of NoSQL are as follows. During the try step, STATUS of the old record is changed from VALID to INVALIDATE_PENDING, a new record is inserted and STATUS of the new record is set to VALIDATE_PENDING. If the confirm step is called, STATUS of the old record is changed from INVALIDATE_PENDING to INVALID and the STATUS of the new record is changed from VALIDATE_PENDING to VALID. If the cancel step is called, STATUS of the old record is changed from INVALIDATE_PENDING to VALID and STATUS of the new record is changed from VALIDATE_PENDING to INVALID.

With continued reference to FIG. 2, and with regard to the try step, the primary database system 204 performs the first sub-transaction with the primary database 212 (e.g., RDBMS database). For example, the first sub-transaction stores one or more records to the primary database 212. If the first sub-transaction is unsuccessful, the cancel step is called, and is described in further detail herein. If the first sub-transaction is successful, the secondary database system 206 performs the second sub-transaction with the secondary database 214 (e.g., NoSQL database). Here, and depending on whether adding, updating, or deleting records, STATUS of one or more old records can be switched from VALID to INVALIDATE_PENDING, and/or one or more new records are inserted and STATUS thereof is set to VALIDATE_PENDING. If these actions are not successful, the cancel step is called. If these actions are successful, the primary database system 204 commits the changes in the primary database 212. If committing is successful, the confirm step is called. If committing, the cancel step is called.

During the global transaction, operations that have some likelihood of failing can include the primary database 212 saving records, the secondary database 214 inserting new records, and the primary database 212 committing changes. In the try step, the transaction management framework puts these operations into the scope of transaction management. That is, only if all of these operations succeed, the transaction management framework will call the confirm step, and, if any of one of these operations fails, the transaction management framework will call the cancel step.

After the try step is complete, there is a short time of inconsistency between the primary database 212 and the secondary database 214. This is during the time that STATUS of some records of the global transaction is VALIDATE_PENDING or INVALIDATE_PENDING in the secondary database 214. However, this inconsistency is relatively quickly resolved through execution of the confirm step or the cancel step, as described in further detail herein.

Figure 3:
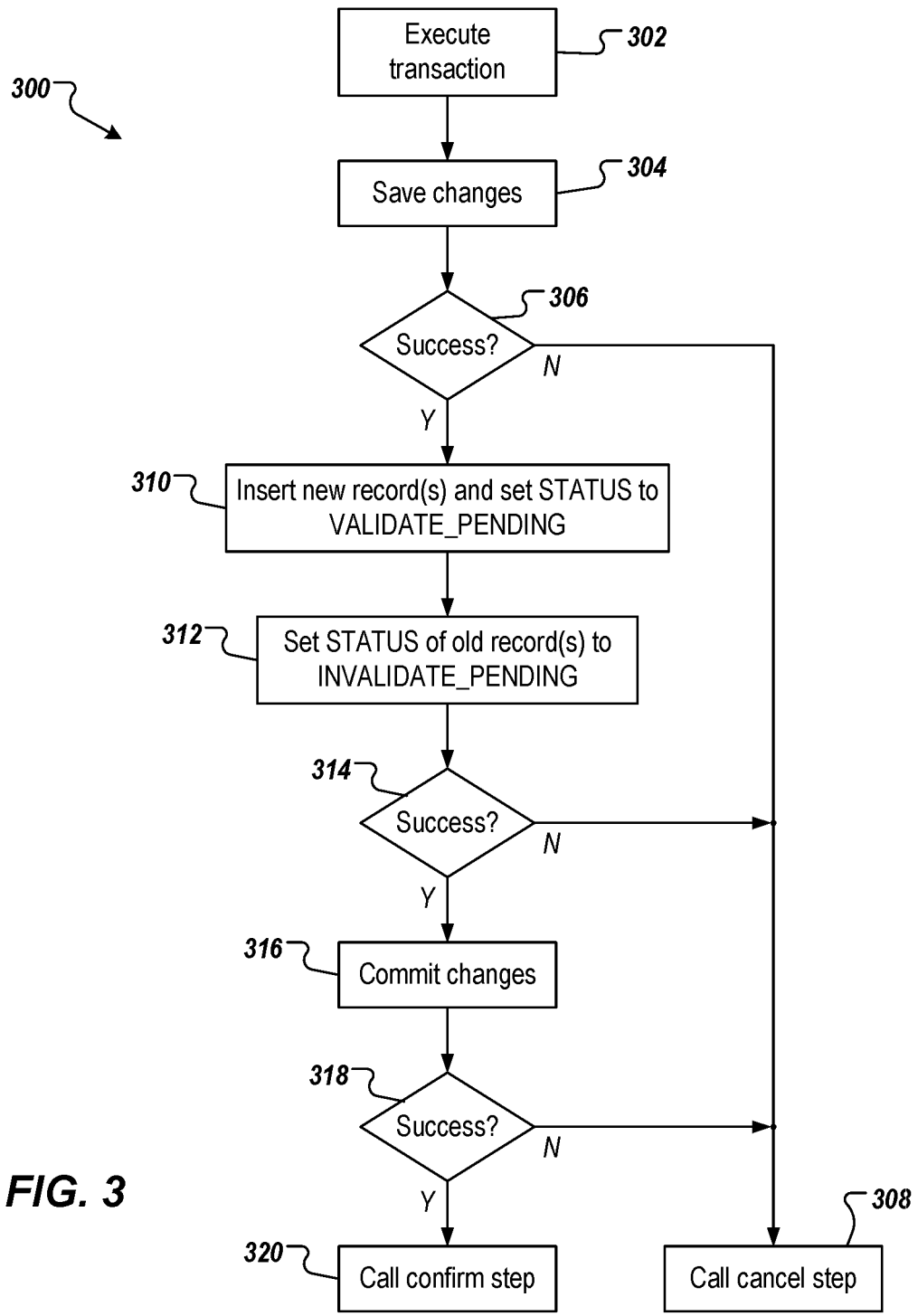
FIGS. 3-5 depict example processes that can be executed in accordance with implementations of the present disclosure.

FIG. 3 depicts an example process 300 that can be executed in accordance with implementations of the present disclosure. In some examples, the example process 300 is executed to perform the try step and is provided using one or more computer-executable programs executed by one or more computing devices. In some examples, the example process 300 is initiated in response to a global transaction (e.g., adding a record, deleting a record, updating a record).

A transaction is executed (302). For example, and as described herein with reference to FIG. 2, a first sub-transaction of the global transaction 220 can be executed by the primary database system 204 to impact (e.g., add, update, delete) one or more records in the primary database 212. Changes are saved (304). For example, and as described herein, the primary database 212 saves any changes resulting from the first sub-transaction. It is determined whether the first sub-transaction was successful (306). If the first sub-transaction was not successful, the cancel step is called (308). Details of the cancel step are described herein with reference to FIG. 5.

If the first sub-transaction was successful, a second sub-transaction is executed. In some cases, one or more new record(s) are inserted and STATUS of the new record(s) is set to VALIDATE_PENDING (310). For example, and as described herein, the secondary database system 206 adds one or more new records to one or more tables in the secondary database 214 and, for each new record, sets STATUS to VALIDATE_PENDING. In some cases, STATUS of one or more old record(s) is changed from VALID to INVALIDATE_PENDING (312). For example, and as described herein, the secondary database system 206, for each old record impacted by the global transaction, sets STATUS of the old record to INVALIDATE_PENDING. One or both of (310) and (312) can be executed. For example, for adding one or more new records, (310) is executed, for deleting one or more old records, (312) is executed, and, for updating one or more old records (310) and (312) are executed. It is determined whether the second sub-transaction was successful (314). If the second sub-transaction was not successful, the cancel step is called (308).

If the second sub-transaction was successful, changes are committed (316). For example, and as described herein, the primary database system 204 commits the changes that result from the global transaction within the primary database 212. It is determined whether the changes were successfully committed (318). If the changes were not successfully committed, the cancel step is called (308). If the changes were successfully committed, the confirm step is called (320). Details of the confirm step are described herein with reference to FIG. 4.

Referring again to FIG. 2, and with regard to the confirm step, STATUS of any new record(s) is switched from VALIDATE_PENDING to VALID and/or STATUS of any old record(s) is switched from INVALIDATE_PENDING to INVALID. If either or both succeed, the global transaction is complete. If either or both fail, a record of scheduling job definition is created in the secondary database 214, and the content of the record is the operation that failed to execute. The job is executed to retry the operation for a predefined maximum retry count. If the retry job succeeds, the global transaction is complete. In some cases, it can occur that the retry job fails after reaching the maximum retry count. In such cases, an error is reported. In general, in the confirm step, the operations are relatively simple, just changing values in the status column. As such, failure is rare. After the confirm step, no record impacted by the global transaction will be either STATUS VALIDATE_PENDING or INVALIDATE_PENDING in the secondary database 214. As such, any previous inconsistency between the primary database 212 and the secondary database 214 is resolved.

Figure 4:
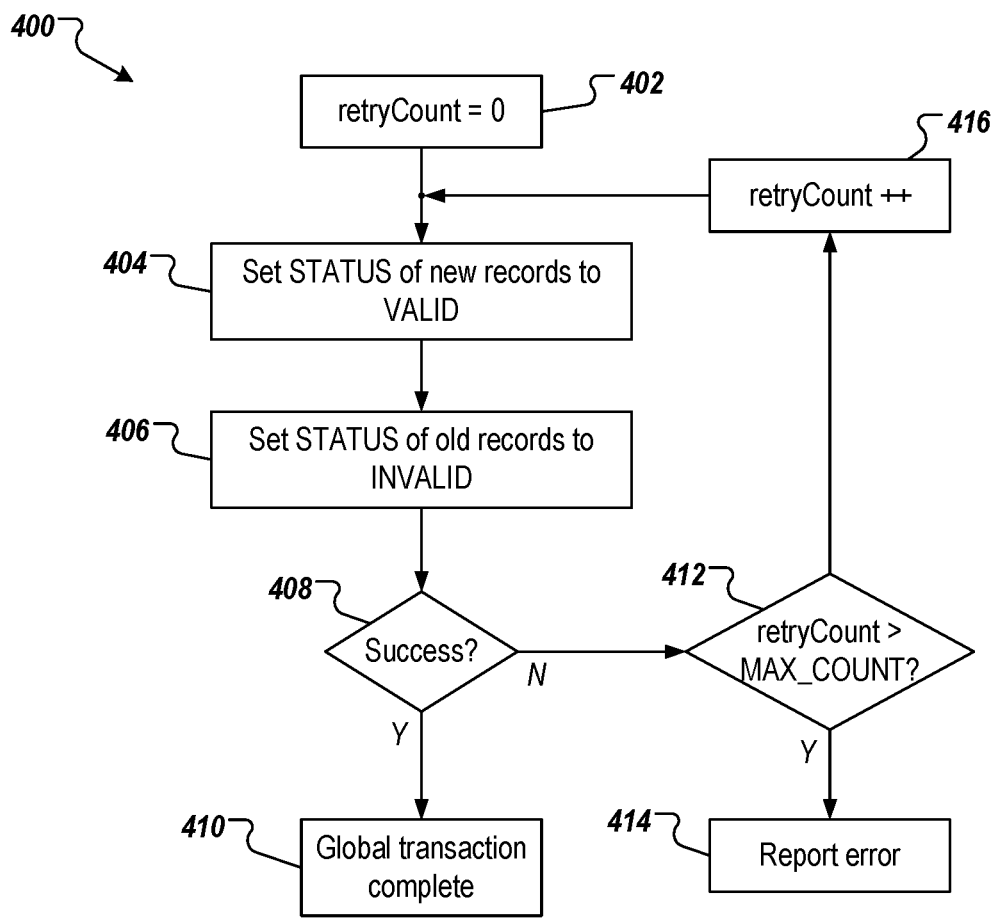

FIG. 4 depicts an example process 400 that can be executed in accordance with implementations of the present disclosure. In some examples, the example process 400 is executed to perform the confirm step and is provided using one or more computer-executable programs executed by one or more computing devices.

A retry counter (retryCount) is initialized (402). In some cases, STATUS of any new record(s) is switched from VALIDATE_PENDING to VALID (404). For example, and as described herein, the secondary database system 206 switches STATUS of any new record(s) from VALIDATE_PENDING to VALID. In some cases, STATUS of any old record(s) is switched from INVALIDATE_PENDING to INVALID (406). For example, and as described herein, the secondary database system 206, for each old record impacted by the global transaction, switches STATUS of the old record to INVALID. One or both of (404) and (406) can be executed. For example, for adding one or more new records, (404) is executed, for deleting one or more old records, (406) is executed, and, for updating one or more old records (404) and (406) are executed. It is determined whether changing status was successful (408). If successful, the global transaction is marked as complete (410). If not successful, it is determined whether retryCount exceeds a maximum retry count (MAX_COUNT) (412). If retryCount exceeds MAX_COUNT, an error is reported (414). If retryCount does not exceed MAX_COUNT, retryCount is incremented, and the example process 400 loops back.

Referring again to FIG. 2, and with regard to the cancel step, the primary database 212 rolls back any changes that had resulted from the first sub-transaction to revert the primary database 212 to a state before execution of the first sub-transaction. The secondary database 214 switches STATUS of any new records from VALIDATE_PENDING to INVALID and/or switches STATUS of any old records from INVALIDATE_PENDING to VALID. If either or both succeed, the global transaction is complete. If either or both fail, a record of scheduling job definition is created in the secondary database 214, and the content of the record is the operation that failed to execute. The job is executed to retry the operation for a predefined maximum retry count. If the retry job succeeds, the global transaction is complete. In some cases, it can occur that the retry job fails after reaching the maximum retry count. In such cases, an error is reported. In general, in the confirm step, the operations are relatively simple, just changing values in the status column. As such, failure is rare. After the confirm step, no record impacted by the global transaction will be either STATUS VALIDATE_PENDING or INVALIDATE_PENDING in the secondary database 214. As such, any previous inconsistency between the primary database 212 and the secondary database 214 is resolved.

Figure 5:
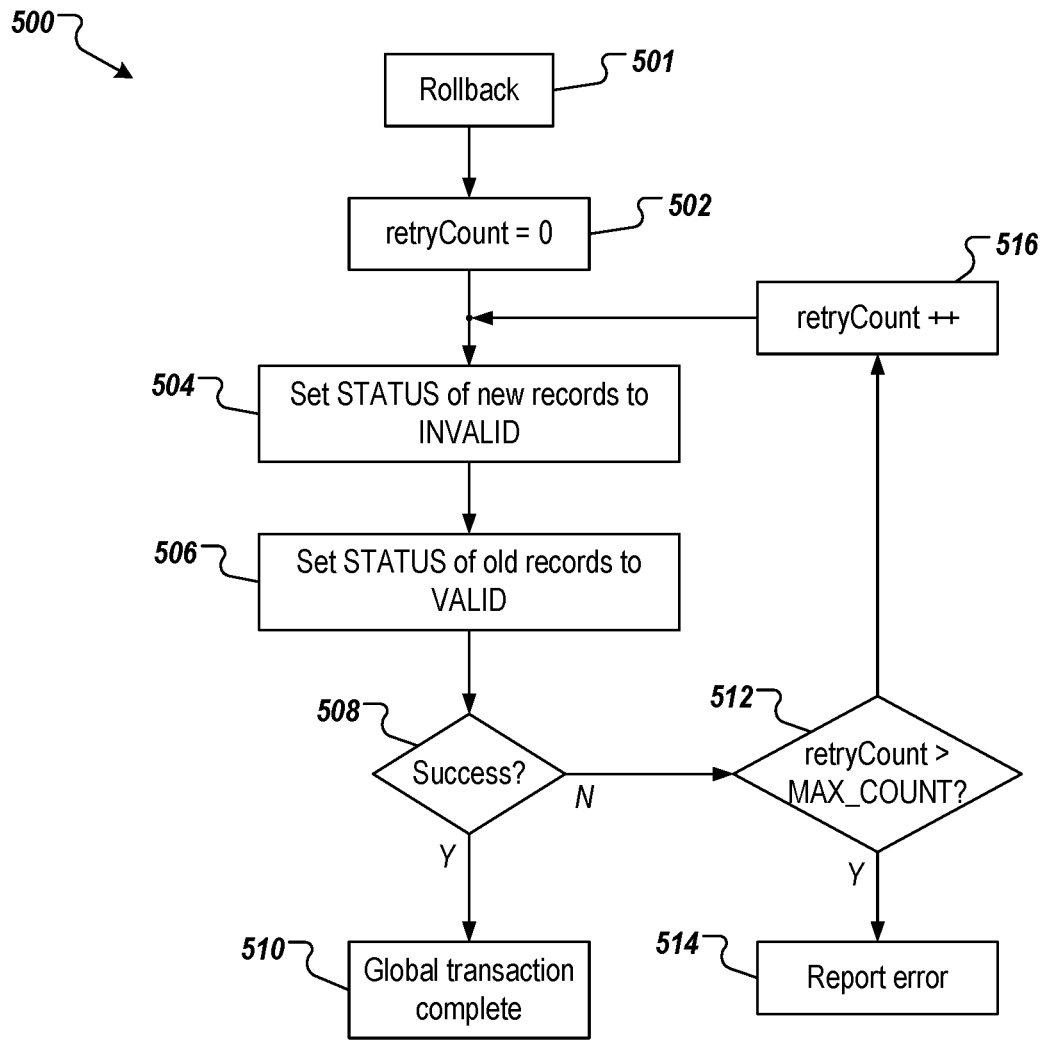

FIG. 5 depicts an example process 500 that can be executed in accordance with implementations of the present disclosure. In some examples, the example process 500 is executed to perform the cancel step and is provided using one or more computer-executable programs executed by one or more computing devices.

Rollback is executed (501). For example, and as described herein, the primary database system 204 rolls back any changes made to records in the primary database 212. A retry counter (retryCount) is initialized (502). In some cases, STATUS of any new record(s) is switched from VALIDATE_PENDING to INVALID (504). For example, and as described herein, the secondary database system 206 switches STATUS of any new record(s) from VALIDATE_PENDING to INVALID. In some cases, STATUS of any old record(s) is switched from INVALIDATE_PENDING to VALID (506). For example, and as described herein, the secondary database system 206, for each old record impacted by the global transaction, switches STATUS of the old record to VALID. One or both of (504) and (506) can be executed. For example, for adding one or more new records, (504) is executed, for deleting one or more old records, (506) is executed, and, for updating one or more old records (504) and (506) are executed. It is determined whether changing status was successful (508). If successful, the global transaction is marked as complete (510). If not successful, it is determined whether retryCount exceeds a maximum retry count (MAX_COUNT) (512). If retryCount exceeds MAX_COUNT, an error is reported (514). If retryCount does not exceed MAX_COUNT, retryCount is incremented, and the example process 500 loops back.

Implementations of the present disclosure are described in further detail herein with reference to examples. The examples are provided for purposes of non-limiting illustration.

In a first example, a global transaction is executed to add a new user to database tables. For example, there is an RDBMS table USER_BASEINFO as represented in Table 3 and there is a NoSQL table USER_RESUME as represented in Table 4:

TABLE 3

RDBMS table USER_BASEINFO

| Column | Type | Remark |
| --- | --- | --- |
| ID | Integer | Primary key |
| USER_ID | Varchar | The Id of the User |
| FIRST_NAME | Varchar | First name of the User |
| LAST_NAME | Varchar | Last name of the User |
| ... | ... | ... |

TABLE 4

NoSQL Table USER_RESUME

| Column | Type | Remark |
| --- | --- | --- |
| ID | Integer | Primary key |
| USER_ID | Varchar | The Id of the User |
| CONTENT | Blob | The content of the resume |
| STATUS | Varchar | Emulation Values: VALIDATE_PENDING, INVALIDATE_PENDING, VALID, INVALID |

In this example, a global transaction is to be executed to insert a record for a new user. The global transaction can include a first sub-transaction that will insert a record in USER_BASEINFO and a second sub-transaction that will insert a record in USER_RESUME. Using the transaction management framework of the present disclosure, several different results can be provided, each ensuring consistency of the data. The results are summarized in Tables A1-A6:

TABLE A1

| Global transaction succeeds (All operations succeed) | | | | |
| --- | --- | --- | --- | --- |
| Step | Operation | Succeed | USER_BASEINFO | USER_RESUME |
| Try | RDBMS starts transaction | Yes | non-existed | non-existed |
| | RDBMS inserts a new record | Yes | inserted | non-existed |
| | NoSQL inserts a new record | Yes | inserted | inserted (VALIDATE_PENDING) |
| | RDBMS commits | Yes | inserted | inserted (VALIDATE_PENDING) |
| Confirm | NoSQL sets new record from VALIDATE_PENDING to VALID | Yes | inserted | inserted (VALID) |

TABLE A2

Global transaction succeeds (Confirm fails at first, succeeds after retry)

| Step | Operation | Succeed | USER_BASEINFO | USER_RESUME |
|---|---|---|---|---|
| Try | RDBMS starts transaction | Yes | non-existed | non-existed |
| | RDBMS inserts a new record | Yes | inserted | non-existed |
| | NoSQL inserts a new record | Yes | inserted | inserted (VALIDATE_PENDING) |
| | RDBMS commits | Yes | inserted | inserted (VALIDATE_PENDING) |
| Confirm | NoSQL sets new record from VALIDATE_PENDING to VALID | No | inserted | inserted (VALIDATE_PENDING) |
| | Schedule a job to retry the above operation of NoSQL | Yes | inserted | inserted (VALID) |

TABLE A3

Global transaction fails (RDBMS fails to insert a new record)

| Step | Operation | Succeed | USER_BASEINFO | USER_RESUME |
|---|---|---|---|---|
| Try | RDBMS starts transaction | Yes | non-existed | non-existed |
| | RDBMS inserts a new record | No | non-existed | non-existed |
| Cancel | RDBMS rollbacks | Yes | non-existed | non-existed |

TABLE A4

Global transaction fails (NoSQL fails to insert a new record)

| Step | Operation | Succeed | USER_BASEINFO | USER_RESUME |
|---|---|---|---|---|
| Try | RDBMS starts transaction | Yes | non-existed | non-existed |
| | RDBMS inserts a new record | Yes | inserted | non-existed |
| | NoSQL inserts a new record | No | inserted | non-existed |
| Cancel | RDBMS rollbacks | Yes | non-existed | non-existed |

TABLE A5

Global transaction fails (RDBMS fails to commit)

| Step | Operation | Succeed | USER_BASEINFO | USER_RESUME |
|---|---|---|---|---|
| Try | RDBMS starts transaction | Yes | non-existed | non-existed |
| | RDBMS inserts a new record | Yes | inserted | non-existed |
| | NoSQL inserts a new record | Yes | inserted | inserted (VALIDATE_PENDING) |
| | RDBMS commits | No | inserted | inserted (VALIDATE_PENDING) |
| Cancel | RDBMS rollbacks | Yes | non-existed | inserted (VALIDATE_PENDING) |
| | NoSQL sets new record from VALIDATE_PENDING to INVALID | Yes | non-existed | inserted (INVALID) |

TABLE A6

Global transaction fails (RDBMS fails to commit, cancel fails at first, succeeds after retry)

| Step | Operation | Succeed | USER_BASEINFO | USER_RESUME |
|---|---|---|---|---|
| Try | RDBMS starts transaction | Yes | non-existed | non-existed |
| | RDBMS inserts a new record | Yes | inserted | non-existed |
| | NoSQL inserts a new record | Yes | inserted | inserted (VALIDATE_PENDING) |
| | RDBMS commits | No | inserted | inserted (VALIDATE_PENDING) |
| Cancel | RDBMS rollbacks | Yes | non-existed | inserted (VALIDATE_PENDING) |
| | NoSQL sets new record from VALIDATE_PENDING to INVALID | No | non-existed | inserted (VALIDATE_PENDING) |
| | Schedule a job to retry the above operation of NoSQL | Yes | non-existed | inserted (INVALID) |

In a second example, a global transaction is executed to delete a user from database tables. For example, there is an RDBMS table USER_BASEINFO as represented in Table 3 and there is a NoSQL table USER_RESUME as represented in Table 4. In this example, the global transaction includes a first sub-transaction that will delete the old record in USER_BASEINFO and a second sub-transaction that will set STATUS of the old record to INVALID in USER_RESUME. Using the transaction management framework of the present disclosure, several different results can be provided, each ensuring consistency of the data. The results are summarized in Tables B1-B6:

TABLE B1

Global transaction succeeds (All operations succeed)

| Step | Operation | Succeed | USER_BASEINFO | USER_RESUME |
|---|---|---|---|---|
| Try | RDBMS starts transaction | Yes | existed | existed (VALID) |
| | RDBMS deletes the old record | Yes | non-existed | existed (VALID) |
| | NoSQL changes the old record to INVALIDATE_PENDING | Yes | non-existed | existed (INVALIDATE_PENDING) |
| | RDBMS commits | Yes | non-existed | existed (INVALIDATE_PENDING) |
| Confirm | NoSQL sets the old record from INVALIDATE_PENDING to INVALID | Yes | non-existed | existed (INVALID) |

TABLE B2

Global transaction succeeds (Confirm fails at first, succeeds after retry)

| Step | Operation | Succeed | USER_BASEINFO | USER_RESUME |
|---|---|---|---|---|
| Try | RDBMS starts transaction | Yes | existed | existed (VALID) |
| | RDBMS deletes the old record | Yes | non-existed | existed (VALID) |
| | NoSQL changes the old record to INVALIDATE_PENDING | Yes | non-existed | existed (INVALIDATE_PENDING) |
| | RDBMS commits | Yes | non-existed | existed (INVALIDATE_PENDING) |
| Confirm | NoSQL sets the old record from INVALIDATE_PENDING to INVALID | No | non-existed | existed (INVALIDATE_PENDING) |
| | Schedule a job to retry the above operation of NoSQL | Yes | non-existed | existed (INVALID) |

TABLE B3

Global transaction fails (RDBMS fails to delete the old record)

| Step | Operation | Succeed | USER_BASEINFO | USER_RESUME |
|---|---|---|---|---|
| Try | RDBMS starts transaction | Yes | existed | existed (VALID) |
|  | RDBMS deletes the old record | No | existed | existed (VALID) |
| Cancel | RDBMS rollbacks | Yes | existed | existed (VALID) |

Result B4. Global transaction fails (NoSQL fails to set the old record to INVALIDATE_PENDING)

| Step | Operation | Succeed | USER_BASEINFO | USER_RESUME |
|---|---|---|---|---|
| Try | RDBMS starts transaction | Yes | existed | existed (VALID) |
|  | RDBMS deletes the old record | Yes | non-existed | existed (VALID) |
|  | NoSQL sets the old record from VALID to INVALIDATE_PENDING | No | non-existed | existed (VALID) |
| Cancel | RDBMS rollbacks | Yes | existed | existed (VALID) |

TABLE B5

Global transaction fails (RDBMS fails to commit)

| Step | Operation | Succeed | USER_BASEINFO | USER_RESUME |
|---|---|---|---|---|
| Try | RDBMS starts transaction | Yes | existed | existed (VALID) |
|  | RDBMS deletes the old record | Yes | non-existed | existed (VALID) |
|  | NoSQL sets the old record to INVALIDATE_PENDING | Yes | non-existed | existed (INVALIDATE_PENDING) |
|  | RDBMS commits | No | non-existed | existed (INVALIDATE_PENDING) |
| Cancel | RDBMS rollbacks | Yes | existed | existed (INVALIDATE_PENDING) |
|  | NoSQL sets the old record from INVALIDATE_PENDING to VALID | Yes | existed | existed (VALID) |

TABLE B6

Global transaction fails (RDBMS fails to commit. Cancel fails at first, succeeds after retry)

| Step | Operation | Succeed | USER_BASEINFO | USER_RESUME |
|---|---|---|---|---|
| Try | RDBMS starts transaction | Yes | existed | existed (VALID) |
|  | RDBMS deletes the old record | Yes | non-existed | existed (VALID) |
|  | NoSQL sets the old record to INVALIDATE_PENDING | Yes | non-existed | existed (INVALIDATE_PENDING) |
|  | RDBMS commits | No | non-existed | existed (INVALIDATE_PENDING) |
| Cancel | RDBMS rollbacks | Yes | existed | existed (INVALIDATE_PENDING) |
|  | NoSQL sets the old record from INVALIDATE_PENDING to VALID | No | existed | existed (INVALIDATE_PENDING) |

TABLE B6-continued

Global transaction fails (RDBMS fails to commit.
Cancel fails at first, succeeds after retry)

| Step | Operation | Succeed | USER_BASEINFO | USER_RESUME |
|---|---|---|---|---|
| | Schedule a job to retry the above operation of NoSQL | Yes | existed | existed (VALID) |

In a third example, a global transaction is executed to update user information within database tables. For example, there is an RDBMS table USER_BASEINFO as represented in Table 3 and there is a NoSQL table USER_RESUME as represented in Table 4. In this example, the global transaction includes a first sub-transaction that will update a record in USER_BASEINFO, and a second sub-transaction that will set STATUS of the old record to INVALID in USER_RESUME and insert a new record with STATUS of VALID in USER_RESUME. Using the transaction management framework of the present disclosure, several different results can be provided, each ensuring consistency of the data. The results are summarized in Tables C1-C8:

TABLE C1

Global transaction succeeds (All operations succeed)

| Step | Operation | Succeed | USER_BASEINFO | USER_RESUME |
|---|---|---|---|---|
| Try | RDBMS starts transaction | Yes | non-updated | old (VALID) |
| | RDBMS updates record | Yes | updated | old (VALID) |
| | NoSQL sets the old record to INVALIDATE_PENDING | Yes | updated | old(INVALIDATE_PENDING) |
| | NoSQL inserts a new record | Yes | updated | old(INVALIDATE_PENDING) new(VALIDATE_PENDING) |
| | RDBMS commits | Yes | updated | old(INVALIDATE_PENDING) new(VALIDATE_PENDING) |
| Confirm | NoSQL sets the old record from INVALIDATE_PENDING to INVALID NoSQL sets new record from VALIDATE_PENDING to VALID | Yes | updated | old (INVALID) new(VALID) |

TABLE C2

Global transaction succeeds (Confirm fails at first, succeeds after retry)

| Step | Operation | Succeed | USER_BASEINFO | USER_RESUME |
|---|---|---|---|---|
| Try | RDBMS starts transaction | Yes | non-updated | old (VALID) |
| | RDBMS updates record | Yes | updated | old (VALID) |
| | NoSQL sets the old record to INVALIDATE_PENDING | Yes | updated | old(INVALIDATE_PENDING) |
| | NoSQL inserts a new record | Yes | updated | old(INVALIDATE_PENDING) new(VALIDATE_PENDING) |
| | RDBMS commits | Yes | updated | old(INVALIDATE_PENDING) new(VALIDATE_PENDING) |
| Confirm | NoSQL sets the old record from INVALIDATE_PENDING to INVALID NoSQL sets new record from VALIDATE_PENDING to VALID | No | non-updated | old (INVALID) new(VALIDATE_PENDING) OR old (INVALIDATE_PENDING) new(VALIDATE_PENDING) OR old (INVALIDATE_PENDING) new(VALID) |

TABLE C2-continued

Global transaction succeeds (Confirm fails at first, succeeds after retry)

| Step | Operation | Succeed | USER_BASEINFO | USER_RESUME |
|---|---|---|---|---|
| | Schedule a job to retry the above operation of NoSQL | Yes | updated | old (INVALID) new(VALID) |

TABLE C3

Global transaction fails (RDBMS fails to update the old record)

| Step | Operation | Succeed | USER_BASEINFO | USER_RESUME |
|---|---|---|---|---|
| Try | RDBMS starts transaction | Yes | non-updated | old (VALID) |
| | RDBMS updates record | No | non-updated | old (VALID) |
| Cancel | RDBMS rollbacks | Yes | non-updated | old (VALID) |

TABLE C4

Global transaction fails (NoSQL fails to set the old record to INVALIDATE_PENDING)

| Step | Operation | Succeed | USER_BASEINFO | USER_RESUME |
|---|---|---|---|---|
| Try | RDBMS starts transaction | Yes | non-updated | old (VALID) |
| | RDBMS updates record | Yes | updated | old (VALID) |
| | NoSQL sets the old record from VALID to INVALIDATE_PENDING | No | updated | old (VALID) |
| Cancel | RDBMS rollbacks | Yes | non-updated | old (VALID) |

TABLE C5

Global transaction fails (NoSQL fails to insert a new record)

| Step | Operation | Succeed | USER_BASEINFO | USER_RESUME |
|---|---|---|---|---|
| Try | RDBMS starts transaction | Yes | non-updated | old (VALID) |
| | RDBMS updates record | Yes | updated | old (VALID) |
| | NoSQL sets the old record from VALID to INVALIDATE_PENDING | Yes | updated | old(INVALIDATE_PENDING) |
| | NoSQL inserts a new record | No | updated | old(INVALIDATE_PENDING) |
| Cancel | RDBMS rollbacks | Yes | non-updated | old(INVALIDATE_PENDING) |
| | NoSQL sets the old record from INVALIDATE_PENDING to VALID | Yes | non-updated | old (VALID) |

TABLE C6

Global transaction fails (NoSQL fails to insert a new record. Cancel fails at first, succeeds after retry)

| Step | Operation | Succeed | USER_BASEINFO | USER_RESUME |
|---|---|---|---|---|
| Try | RDBMS starts transaction | Yes | non-updated | old (VALID) |

TABLE C6-continued

Global transaction fails (NoSQL fails to insert a new record. Cancel fails at first, succeeds after retry)

| Step | Operation | Succeed | USER_BASEINFO | USER_RESUME |
|---|---|---|---|---|
| | RDBMS updates record | Yes | updated | old (VALID) |
| | NoSQL sets the old record from VALID to INVALIDATE_PENDING | Yes | updated | old(INVALIDATE_PENDING) |
| | NoSQL inserts a new record | No | updated | old(INVALIDATE_PENDING) |
| Cancel | RDBMS rollbacks | Yes | non-updated | old(INVALIDATE_PENDING) |
| | NoSQL sets the old record from INVALIDATE_PENDING to VALID | No | non-updated | old(INVALIDATE_PENDING) |
| | Schedule a job to retry the above operation of NoSQL | Yes | non-updated | old (VALID) |

TABLE C7

Global transaction fails (RDBMS fails to commit.)

| Step | Operation | Succeed | USER_BASEINFO | USER_RESUME |
|---|---|---|---|---|
| Try | RDBMS starts transaction | Yes | non-updated | old (VALID) |
| | RDBMS updates record | Yes | updated | old (VALID) |
| | NoSQL sets the old record to INVALIDATE_PENDING | Yes | updated | old(INVALIDATE_PENDING) |
| | NoSQL inserts a new record | Yes | updated | old(INVALIDATE_PENDING) new(VALIDATE_PENDING) |
| | RDBMS commits | No | updated | old(INVALIDATE_PENDING) new(VALIDATE_PENDING) |
| Cancel | RDBMS rollbacks | Yes | non-updated | old(INVALIDATE_PENDING) new(VALIDATE_PENDING) |
| | NoSQL sets the old record from INVALIDATE_PENDING to VALID | Yes | non-updated | old (VALID) new(INVALID) |
| | NoSQL sets new record from VALIDATE_PENDING to INVALID | | | |

TABLE C8

Global transaction fails (RDBMS fails to commit. Cancel fails at first, succeeds after retry)

| Step | Operation | Succeed | USER_BASEINFO | USER_RESUME |
|---|---|---|---|---|
| Try | RDBMS starts transaction | Yes | non-updated | old (VALID) |
| | RDBMS updates record | Yes | updated | old (VALID) |
| | NoSQL sets the old record to INVALIDATE_PENDING | Yes | updated | old(INVALIDATE_PENDING) |
| | NoSQL inserts a new record | Yes | updated | old(INVALIDATE_PENDING) new(VALIDATE_PENDING) |
| | RDBMS commits | No | updated | old(INVALIDATE_PENDING) new(VALIDATE_PENDING) |

TABLE C8-continued

Global transaction fails (RDBMS fails to commit.
Cancel fails at first, succeeds after retry)

| Step | Operation | Succeed | USER_BASEINFO | USER_RESUME |
|---|---|---|---|---|
| Cancel | RDBMS rollbacks | Yes | non-updated | old(INVALIDATE_PENDING) new(VALIDATE_PENDING) |
| | NoSQL sets the old record from INVALIDATE_PENDING to VALID NoSQL sets new record from VALIDATE_PENDING to INVALID | No | non-updated | old (INVALIDATE_PENDING) new(INVALID) OR old (INVALIDATE_PENDING) new(VALIDATE_PENDING) OR old (VALID) new(VALIDATE_PENDING) |
| | Schedule a job to retry the above operation of NoSQL | Yes | non-updated | old (VALID) new(INVALID) |

Figure 6:
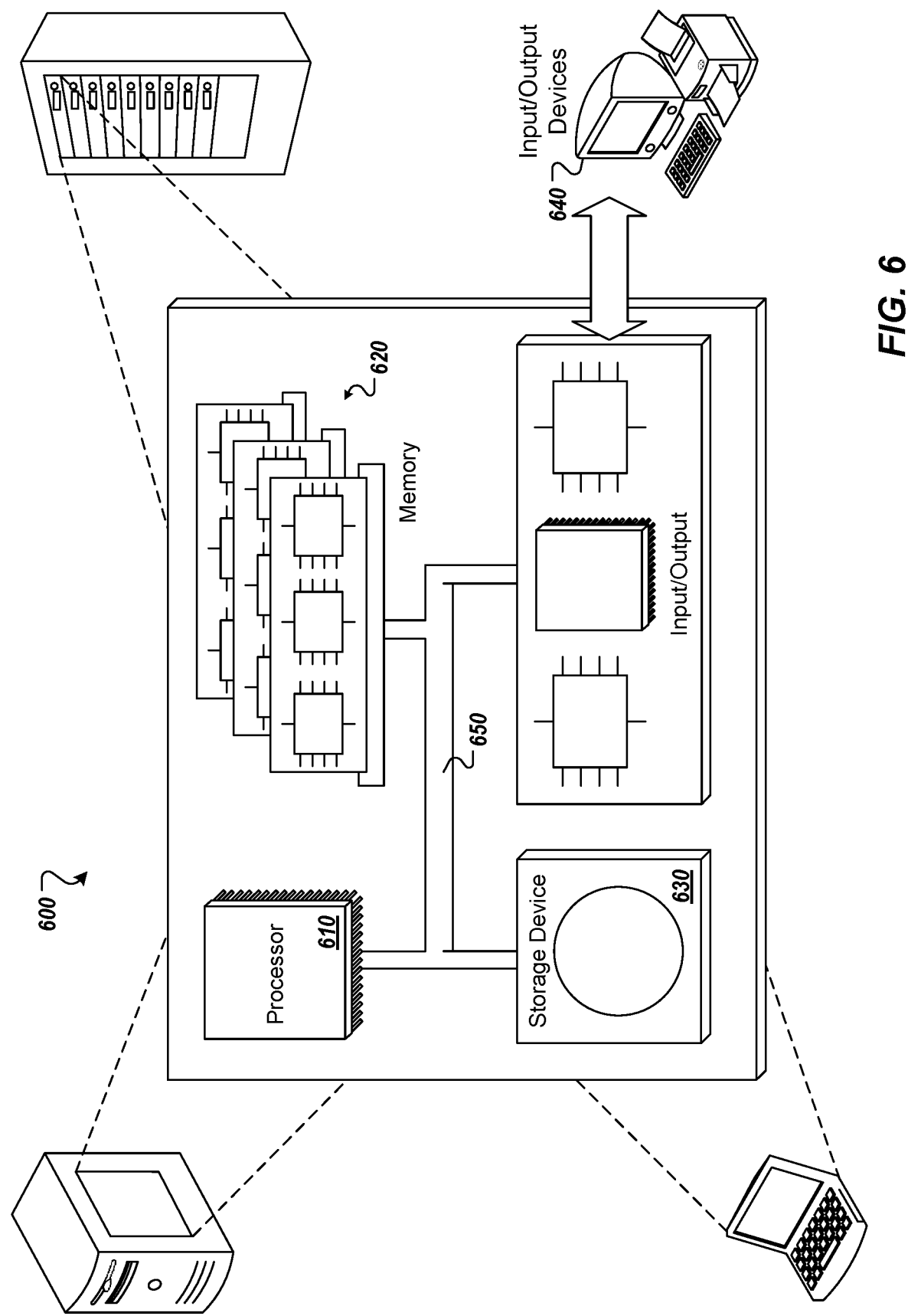
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for executing global transactions that impact records in multiple, disparate database systems, the method being executed by one or more processors and comprising:
   executing, by a first database system, a first sub-transaction of a global transaction, the first sub-transaction impacting a primary record of a first data table stored within a first database of the database system;
   in response to successful execution of the first sub-transaction, executing, by a second database system, a second sub-transaction comprising setting a status of a secondary record to a pending status in a status column of a second data table that stores the secondary record, the pending status inhibiting the second record from being used to generate responses to queries executed over the second data table;
   in response to successfully setting the status, executing, by the first database system, one or more operations to commit changes to the primary record; and
   selectively setting, by the second database system, the status to one of a first final status and a second final status.

2. The method of claim 1, wherein the pending status comprises an invalidate pending status and one of:
   the first final status comprises an invalid status that is set in response to determining that the changes to the primary record are successfully committed; and
   the first final status comprises a valid status that is set in response to determining that the changes to the primary record failed to be committed.

3. The method of claim 1, wherein the pending status comprises a validate pending status and one of:
   the second final status comprises a valid status that is set in response to determining that the changes to the primary record are successfully committed; and
   the second final status comprises an invalid status that is set in response to determining that the changes to the primary record failed to be committed.

4. The method of claim 1, wherein execution of the second sub-transaction results in one of adding the secondary record to the secondary database and deleting the secondary record from the secondary database.

5. The method of claim 1, wherein selectively setting the status to one of a first final status and a second final status comprises at least one retry to set the status to one of a first final status and a second final status.

6. The method of claim 1, wherein the primary record and the secondary record are representative of an entity.

7. The method of claim 1, wherein the first database comprises a relational database management system (RDBMS) database and the second database comprises a non-RDBMS database.

8. A non-transitory computer-readable storage medium coupled to one or more processors and having instructions stored thereon which, when executed by the one or more processors, cause the one or more processors to perform operations for executing global transactions that impact records in multiple, disparate database systems, the operations comprising:
   executing, by a first database system, a first sub-transaction of a global transaction, the first sub-transaction impacting a primary record of a first data table stored within a first database of the database system;
   in response to successful execution of the first sub-transaction, executing, by a second database system, a second sub-transaction comprising setting a status of a secondary record to a pending status in a status column of a second data table that stores the secondary record, the pending status inhibiting the second record from being used to generate responses to queries executed over the second data table;
   in response to successfully setting the status, executing, by the first database system, one or more operations to commit changes to the primary record; and
   selectively setting, by the second database system, the status to one of a first final status and a second final status.

9. The non-transitory computer-readable storage medium of claim 8, wherein the pending status comprises an invalidate pending status and one of:
   the first final status comprises an invalid status that is set in response to determining that the changes to the primary record are successfully committed; and
   the first final status comprises a valid status that is set in response to determining that the changes to the primary record failed to be committed.

10. The non-transitory computer-readable storage medium of claim 8, wherein the pending status comprises a validate pending status and one of:
    the second final status comprises a valid status that is set in response to determining that the changes to the primary record are successfully committed; and
    the second final status comprises an invalid status that is set in response to determining that the changes to the primary record failed to be committed.

11. The non-transitory computer-readable storage medium of claim 8, wherein execution of the second sub-transaction results in one of adding the secondary record to the secondary database and deleting the secondary record from the secondary database.

12. The non-transitory computer-readable storage medium of claim 8, wherein selectively setting the status to one of a first final status and a second final status comprises at least one retry to set the status to one of a first final status and a second final status.

13. The non-transitory computer-readable storage medium of claim 8, wherein the primary record and the secondary record are representative of an entity.

14. The non-transitory computer-readable storage medium of claim 8, wherein the first database comprises a relational database management system (RDBMS) database and the second database comprises a non-RDBMS database.

15. A system, comprising:
  computing devices; and
  non-transitory computer-readable storage devices coupled to the computing devices and having instructions stored thereon which, when executed by the computing devices, cause the computing devices to perform operations for executing global transactions that impact records in multiple, disparate database systems, the operations comprising:
    executing, by a first database system, a first sub-transaction of a global transaction, the first sub-transaction impacting a primary record of a first data table stored within a first database of the database system;
    in response to successful execution of the first sub-transaction, executing, by a second database system, a second sub-transaction comprising setting a status of a secondary record to a pending status in a status column of a second data table that stores the secondary record, the pending status inhibiting the second record from being used to generate responses to queries executed over the second data table;
    in response to successfully setting the status, executing, by the first database system, one or more operations to commit changes to the primary record; and
    selectively setting, by the second database system, the status to one of a first final status and a second final status.

16. The system of claim 15, wherein the pending status comprises an invalidate pending status and one of:
  the first final status comprises an invalid status that is set in response to determining that the changes to the primary record are successfully committed; and
  the first final status comprises a valid status that is set in response to determining that the changes to the primary record failed to be committed.

17. The system of claim 15, wherein the pending status comprises a validate pending status and one of:
  the second final status comprises a valid status that is set in response to determining that the changes to the primary record are successfully committed; and
  the second final status comprises an invalid status that is set in response to determining that the changes to the primary record failed to be committed.

18. The system of claim 15, wherein execution of the second sub-transaction results in one of adding the secondary record to the secondary database and deleting the secondary record from the secondary database.

19. The system of claim 15, wherein selectively setting the status to one of a first final status and a second final status comprises at least one retry to set the status to one of a first final status and a second final status.

20. The system of claim 15, wherein the primary record and the secondary record are representative of an entity.

* * * * *